US012535083B2

(12) United States Patent
Fujita (10) Patent No.: US 12,535,083 B2
(45) Date of Patent: Jan. 27, 2026

(54) CENTRIFUGAL FAN (71) Applicant: MINEBEA MITSUMI Inc., Nagano (JP)

(72) Inventor: Kazuhiko Fujita, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/836,052

(22) PCT Filed: Jan. 23, 2023

(86) PCT No.: PCT/JP2023/001917
§ 371 (c)(1),
(2) Date: Apr. 2, 2025

(87) PCT Pub. No.: WO2023/149260
PCT Pub. Date: Aug. 10, 2023

(65) Prior Publication Data
US 2025/0290522 A1 Sep. 18, 2025

(30) Foreign Application Priority Data
Feb. 7, 2022 (JP) .................. 2022-017142

(51) Int. Cl.
F04D 29/42 (2006.01)
F04D 17/08 (2006.01)
F04D 29/28 (2006.01)

(52) U.S. Cl.
CPC ......... F04D 29/4226 (2013.01); F04D 17/08 (2013.01); F04D 29/281 (2013.01)

(58) Field of Classification Search
None
See application file for complete search history.

(56) References Cited

U.S. PATENT DOCUMENTS 3,154,242 A * 10/1964 Harris .................. F04D 29/626
417/361
4,120,615 A 10/1978 Keem et al.
(Continued)

FOREIGN PATENT DOCUMENTS

DE 4234147 A1 4/1994
JP S61-116200 U 7/1966
(Continued)

OTHER PUBLICATIONS

International Search Report for corresponding International Application No. PCT/JP2023/001917 mailed Mar. 20, 2023.
(Continued)

Primary Examiner — Courtney D Heinle
Assistant Examiner — Danielle M. Christensen
(74) Attorney, Agent, or Firm — Chrisman Gallo Tochtrop LLC (57) ABSTRACT To provide a centrifugal fan capable of securing a degree of freedom of arrangement of the centrifugal fan in, for example, a vehicle body and preventing damage to a coupling member in advance. A centrifugal fan accommodates an impeller and a motor rotating the impeller inside a casing having an upper casing and a lower casing coupled with a first coupling part and a second coupling part. The upper casing includes an upper outer peripheral wall part forming an outer peripheral surface, the lower casing includes a lower outer peripheral wall part forming an outer peripheral surface, and the first coupling part includes a fitting part positioned radially more inward than the outer peripheral surface of the upper outer peripheral wall part, protruding toward the lower casing side, and fitted at an inner side of the lower outer peripheral wall part. The fitting part includes a claw part protruding radially outward at an end part at the lower casing side, and the second coupling part includes an (Continued)

engagement hole part provided at the lower outer peripheral wall part and engaging with the claw part.

12 Claims, 6 Drawing Sheets

(56) References Cited

U.S. PATENT DOCUMENTS

| | | |
|---|---|---|
| 4,599,042 A | 7/1986 | Colliver |
| 5,141,397 A | 8/1992 | Sullivan |
| 6,575,701 B2 * | 6/2003 | Kamiya ............. B60H 1/00471 415/206 |

FOREIGN PATENT DOCUMENTS

| | | |
|---|---|---|
| JP | S58-69717 U | 5/1983 |
| JP | S59-224497 A | 12/1984 |
| JP | S61-183498 U | 11/1986 |
| JP | H04-269399 A | 9/1992 |
| JP | 2006-207523 A | 8/2006 |
| JP | 2009-264213 A | 11/2009 |
| JP | 6074607 B2 | 2/2017 |
| WO | 2022/009565 A1 | 1/2022 |

OTHER PUBLICATIONS

Written Opinion for corresponding International Application No. PCT/JP2023/001917 dated Mar. 20, 2023.

* cited by examiner

CENTRIFUGAL FAN

CROSS REFERENCE TO RELATED APPLICATIONS

This application is a U.S. national stage entry of International Application No. PCT/JP2023/001917, filed on Jan. 23, 2023, which claims priority to Japanese Patent Application 2022-017142, filed on Feb. 7, 2022, which is incorporated herein by reference.

TECHNICAL FIELD

The disclosure relates to a centrifugal fan having a casing with an upper casing and a lower casing coupled with a coupling part, and more particularly relates to a technique of achieving a configuration with the coupling part not protruding radially outward from outer circumferences of the upper casing and the lower casing.

BACKGROUND

Centrifugal fans are widely used for air blowing, ventilation, cooling, and the like in home appliances, office automation equipment, and air conditioners for industrial use and automobiles (see, for example, JP 6074607 B). The centrifugal fan disclosed in JP 6074607 B includes a blower lower case 101 and a blower upper case 102, and the blower lower case 101 and the blower upper case 102 are coupled by engaging a hook 111a provided at an opening part peripheral edge of the blower upper case 102 with a protrusion part 110a provided at an opening part peripheral edge of the blower lower case.

SUMMARY

In the centrifugal fan described in JP 6074607 B, the protrusion part 110a and the hook 111a protrude radially outward from the outer peripheries of the blower lower case 101 and the blower upper case 102. For this reason, when the centrifugal fan is attached inside a vehicle body for cooling a battery of an automobile, for example, the attachment position may be limited in order to prevent the protrusion part 110a and the hook 111a from interfering with various components inside the vehicle body, or the protrusion part 110a and the hook 111a may be damaged by contact with the components.

The disclosure has been made in view of the above circumstances, and an object is to provide a centrifugal fan having a member for coupling divided casings configured to not protrude radially outward, and thus a degree of freedom of arrangement of the centrifugal fan in, for example, a vehicle body is secured and damage to a coupling member can be prevented in advance.

The disclosure is a centrifugal fan accommodating an impeller and a motor for rotating the impeller inside a casing formed by coupling a first casing and a second casing with a first coupling part and a second coupling part. The first casing includes a first outer peripheral wall part forming an outer peripheral surface. The second casing includes a second outer peripheral wall part forming an outer peripheral surface. The first coupling part includes a fitting part positioned radially more inward than an outer peripheral surface of the first outer peripheral wall part, protrudes toward the second casing side, and fits at an inner side of the second outer peripheral wall part. The fitting part includes a claw part protruding radially outward at an end part at the second casing side. The second coupling part includes an engagement recess part provided at the second outer peripheral wall part and engaging with the claw part.

According to the disclosure, a centrifugal fan having a member for coupling divided casings configured to not protrude radially outward, and thus a degree of freedom of arrangement of the centrifugal fan in a device is secured and damage to a coupling member can be prevented in advance is provided.

DESCRIPTION OF EMBODIMENTS

1. Overall Configuration of Centrifugal Fan

Figure 1:
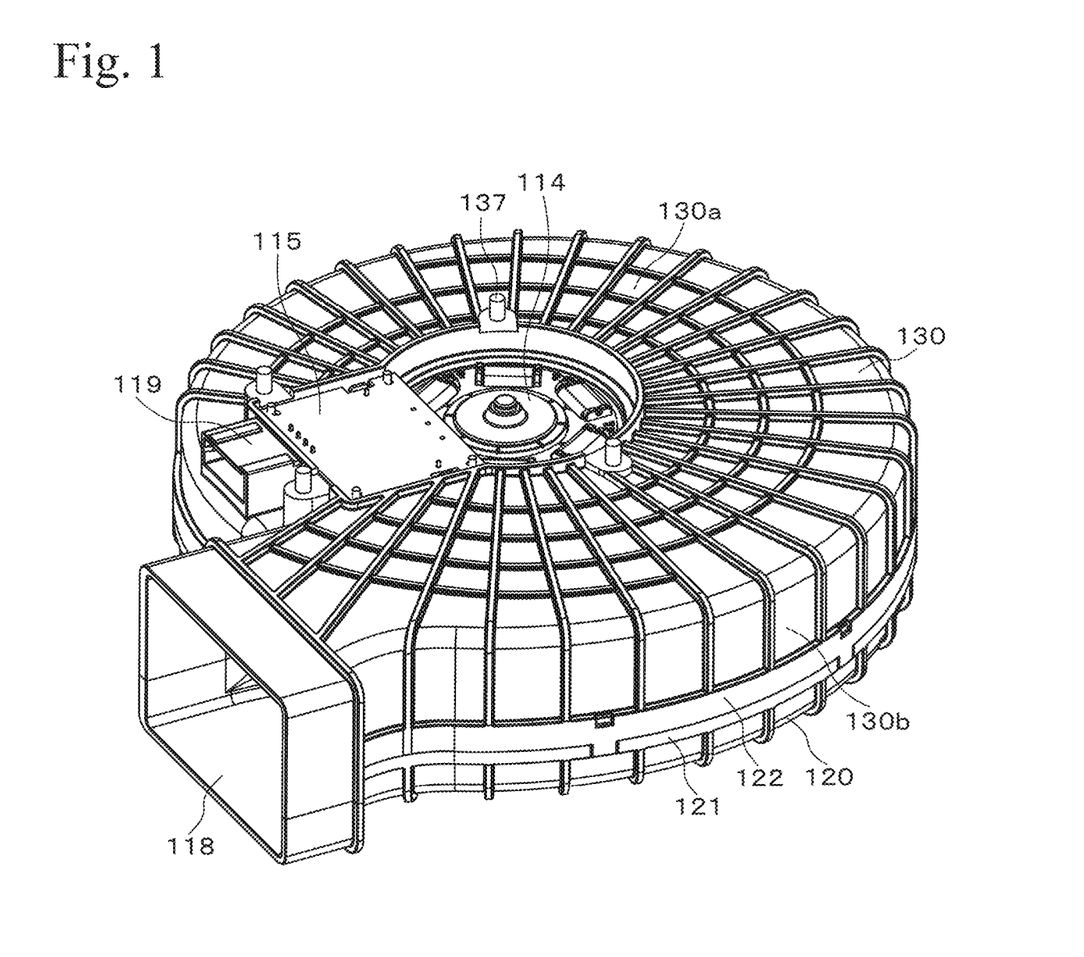
FIG. 1 is a perspective view of a centrifugal fan of an embodiment of the disclosure as viewed from a back side.
Figure 2:
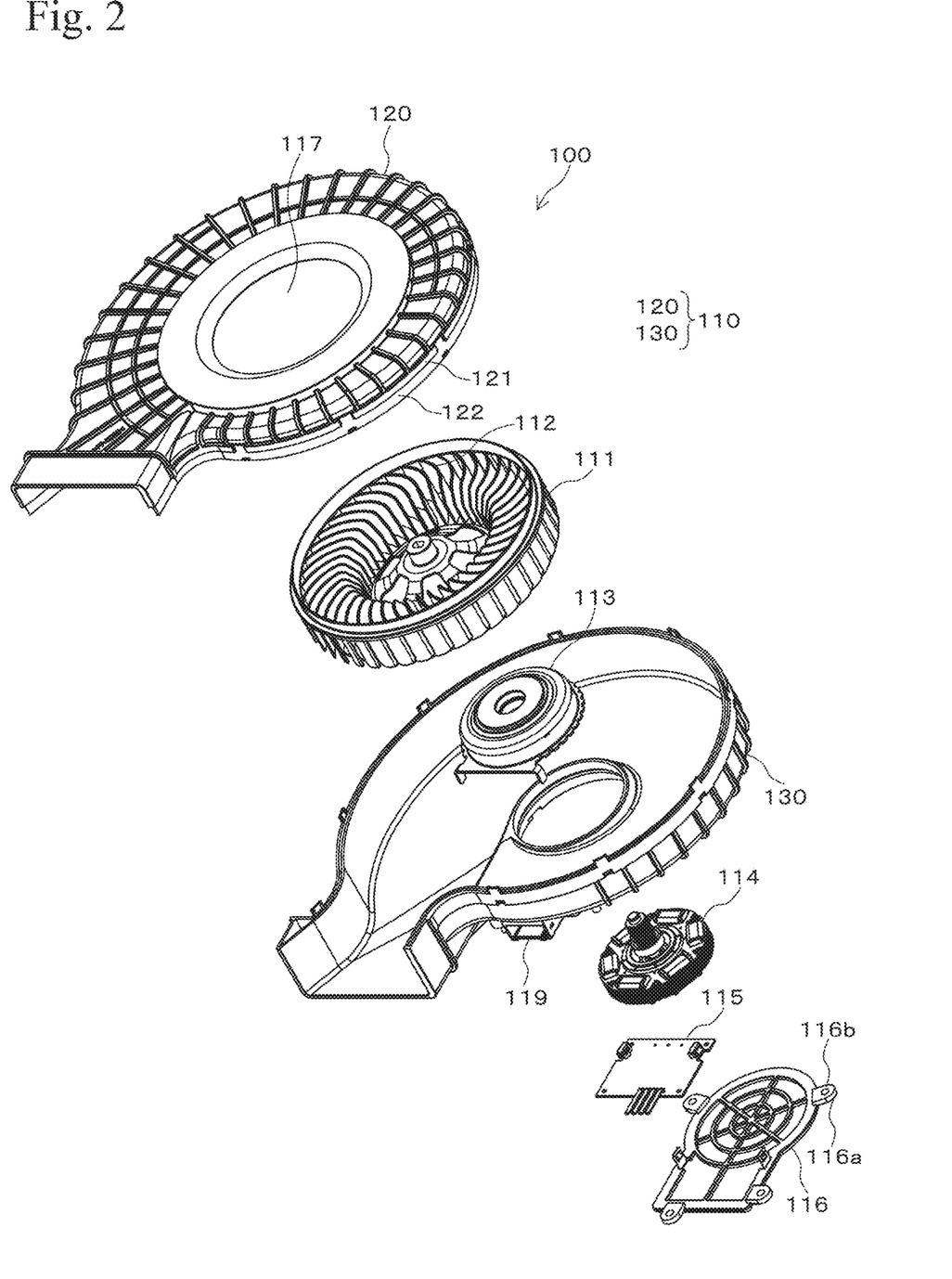
FIG. 2 is an exploded perspective view of the centrifugal fan of the embodiment of the disclosure.

FIGS. 1 and 2 illustrate a centrifugal fan 100 of an embodiment of the disclosure. The centrifugal fan 100 includes a casing 110. The casing 110 includes an upper casing (first casing) 120 formed of resin and a lower casing (second casing) 130 formed of resin. The casing 110 has a spiral flow path with a sectional area gradually increasing toward a counterclockwise direction in FIG. 2.

The casing 110 is provided with an impeller 111 rotatably disposed at an inner space at an axial center side and an annular part around the inner space. The impeller 111 includes a plurality of blades 112, and rotates to exhaust air in a centrifugal direction from the annular part through among the plurality of blades 112. The casing 110 includes a motor housing 113, a motor 114 attached to the motor housing 113 and having a shaft connected to the impeller 111, a circuit board 115 for supplying the motor 114 with a drive current, and a cover 116 for covering a central opening part of the circuit board 115 and the lower casing 130.

The casing 110 includes a suction port 117, being an opening provided at a position opposing the inner space of the impeller 111 of the upper casing 120 and guides air to the inner space of the impeller 111, and a discharge port 118, being a terminal end of a flow path of air sucked from the suction port 117. In FIG. 1, reference sign 119 denotes a socket housing. In the socket housing 119, a terminal connected to the circuit board 115 protrudes, and is connected to an external power supply by inserting a socket.

In the centrifugal fan 100 having the above configuration, when the motor 114 rotates, the impeller 111 rotates. When the impeller 111 rotates, air is sucked from the suction port 117 and guided to the inside of the impeller 111 (the internal space at the axial center side). This air is blown out in the centrifugal direction from the inside of the impeller 111 by the action of the blades 112. The air blown out from the impeller 111 flows through the spiral flow path toward the discharge port 118 illustrated in FIG. 1 and is exhausted from the discharge port 118.

2. Configuration of Casing

Next, a detailed configuration of the casing 110 will be described. In the following description, a vertical direction in FIGS. 3 to 7 is called "axial", a direction orthogonal to the axial direction is called "radial", and a direction rotating about the axial direction as a central axis is called "circumferential". Terms indicating directions such as "upper" and "lower" are used to indicate directions in FIGS. 3 to 7.

Figure 3:
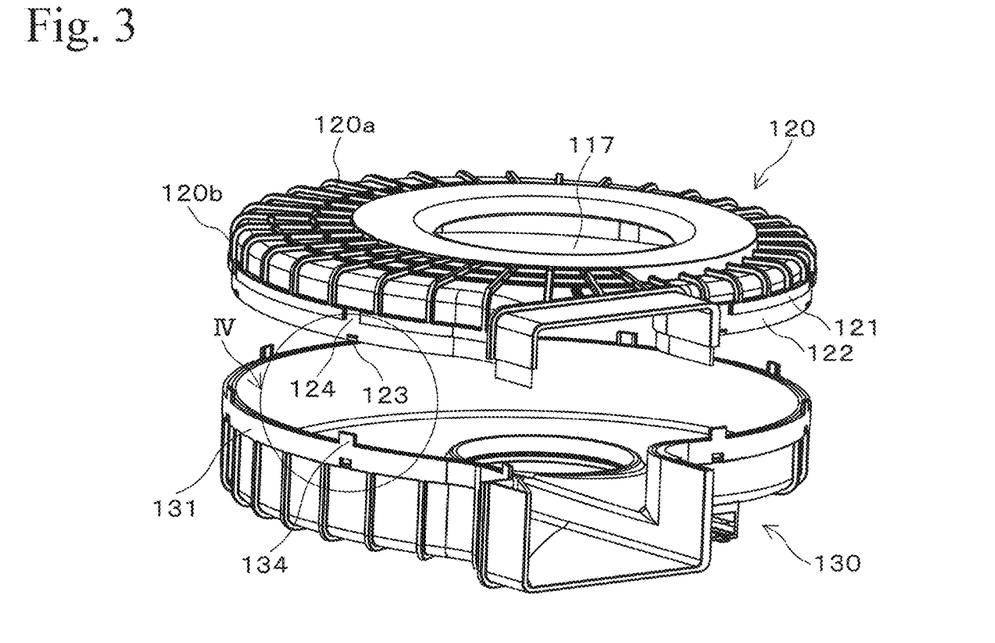
FIG. 3 is a perspective view illustrating an upper casing and a lower casing of the centrifugal fan in the embodiment of the disclosure.
Figure 4:
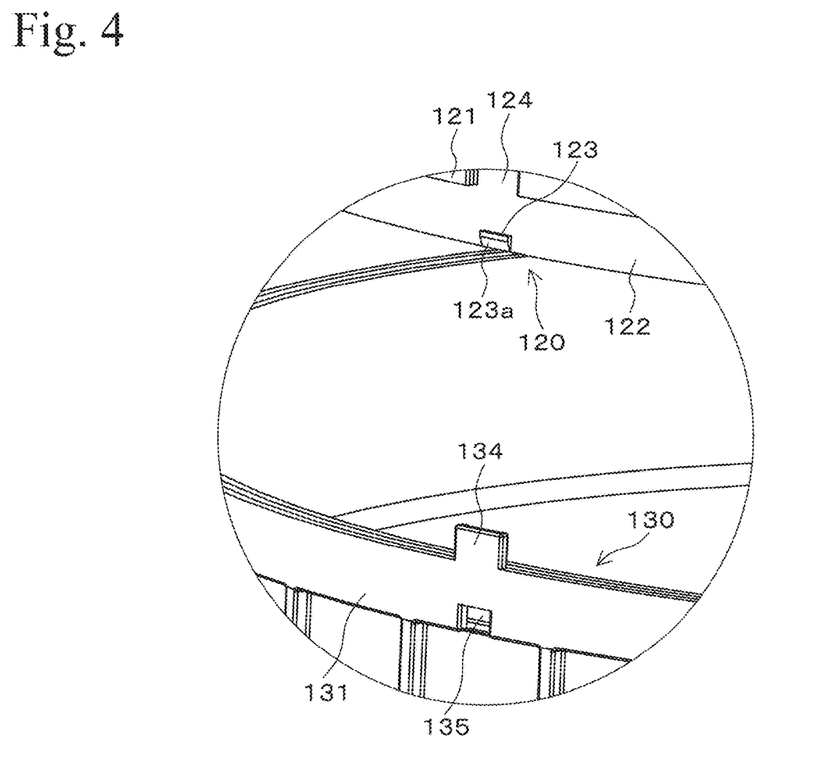
FIG. 4 is an enlarged view of a part indicated by arrow IV of FIG. 3.

The upper casing 120 includes an upper wall part 120a having a substantially ring shape provided with a plurality of radiation ribs and circumferential ribs, and a side wall part 120b having a substantially annular shape. In the side wall part 120b, an upper outer peripheral wall part (first outer peripheral wall part) 121 is formed over the entire circumference excluding the part of the discharge port 118. A fitting part 122 is formed at an inner side of the upper outer peripheral wall part 121. The fitting part 122 is integrally formed of resin with the upper outer peripheral wall part 121, protrudes toward the lower casing 130 side, and is formed over the entire circumference excluding the part of the discharge port 118 along the upper outer peripheral wall part 121.

A plurality of claw parts (first coupling parts) 123 protruding radially outward are formed at substantially the same interval at a lower end edge of an outer periphery of the fitting part 122. An inclined surface 123a having a thickness gradually decreasing downward is formed at a lower part of the claw part 123 (see FIGS. 4 and 6).

In the upper outer peripheral wall part 121, a cutout part 124 is formed at the position of the claw part 123. The cutout part 124 is several parts of the upper outer peripheral wall part 121 cut into a rectangular shape, and the outer peripheral surface of the cutout part 124 is continuous with the outer peripheral surface of the fitting part 122.

Next, the lower casing 130 will be described. The lower casing 130 includes a lower wall part 130a (see FIG. 1) having a substantially ring shape provided with a plurality of radiation ribs and circumferential ribs, and a side wall part 130b having a substantially annular shape. In the side wall part 130b, a lower outer peripheral wall part (second outer peripheral wall part) 131 is formed over the entire circumference excluding the part of the discharge port 118. An inner peripheral wall part 132 is formed at an inner side of the lower outer peripheral wall part 131 with a gap.

The inner peripheral wall part 132 is integrally formed of resin with the lower outer peripheral wall part 131, and is formed over the entire circumference excluding the part of the discharge port 118 along the lower outer peripheral wall part 131 at the same height as the lower outer peripheral wall part 131. A gap between this inner peripheral wall part 132 and the lower outer peripheral wall part 131 is a pocket part 133 fitted with the fitting part 122. The radial dimension of the pocket part 133 is set to be slightly smaller than the radial dimension of the claw part 123.

A plurality of protrusion parts 134 protruding upward is formed at an upper edge part of the lower outer peripheral wall part 131. The position of the protrusion part 134 matches the position of the cutout part 124 of the upper outer peripheral wall part 121, and the protrusion part 134 is fitted to the cutout part 124 when the upper and lower casings 120 and 130 are assembled. In the fitted state, the outer peripheral surface of the protrusion part 134 has a dimension flush with the outer peripheral surface of the upper outer peripheral wall part 121.

Figure 7:
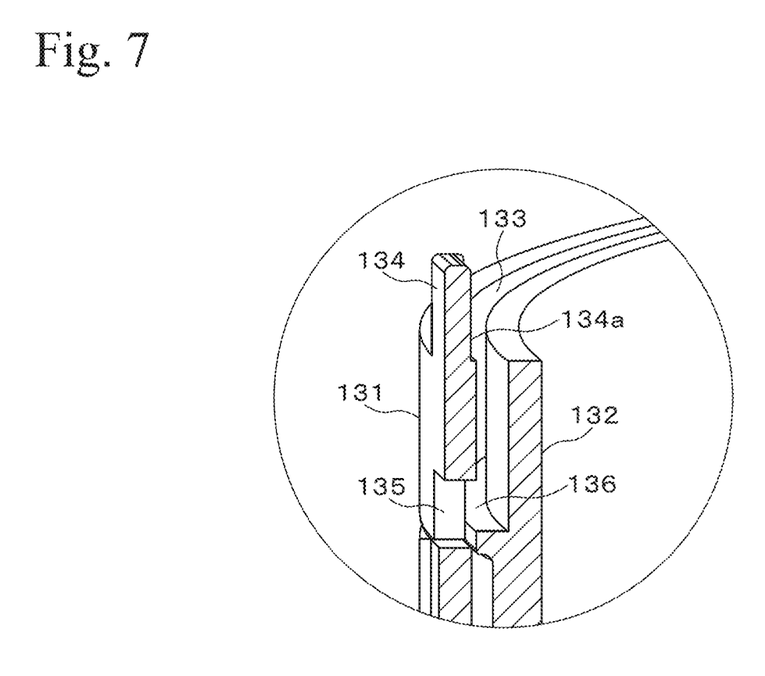
FIG. 7 is an enlarged view of a part indicated by arrow VII of FIG. 6.

An inner peripheral surface of the protrusion part 134 is provided with a groove part 134a. The claw part 123 is fitted into the groove part 134a. As illustrated in FIG. 7, an engagement hole part (the second coupling part and the engagement recess part) 135 penetrating the inner and outer peripheries is formed below the protrusion part 134. The claw part 123 engages with the engagement hole part 135 when the upper and lower casings 120 and 130 are assembled.

A flange part 136 is formed over the entire circumference of the inner peripheral wall part 132 at the position of the engagement hole part 135 of the inner peripheral wall part 132. When the upper and lower casings 120 and 130 are assembled, the lower end surface of the claw part 123 abuts the upper surface of the flange part 136.

As illustrated in FIG. 1, a plurality of boss parts 137 are formed at the lower wall part 130a of the lower casing 130. The boss part 137 is thermally caulked through a hole 116b formed at a bracket 116a of the cover 116.

3. Assembly Method of Centrifugal Fan i) Attachment of Impeller to Lower Casing

The lower casing 130 is attached with the motor housing 113, and the motor housing 113 is attached with the motor 114. The shaft of the motor 114 protruding from the motor housing 113 is attached to the center part of the impeller 111. A coil of the motor 114 is connected to the circuit board 115, and the circuit board 115 is attached to the lower casing 130. Finally, the cover 116 is attached to the lower casing 130.

ii) Coupling of Upper and Lower Casings

Figure 5:
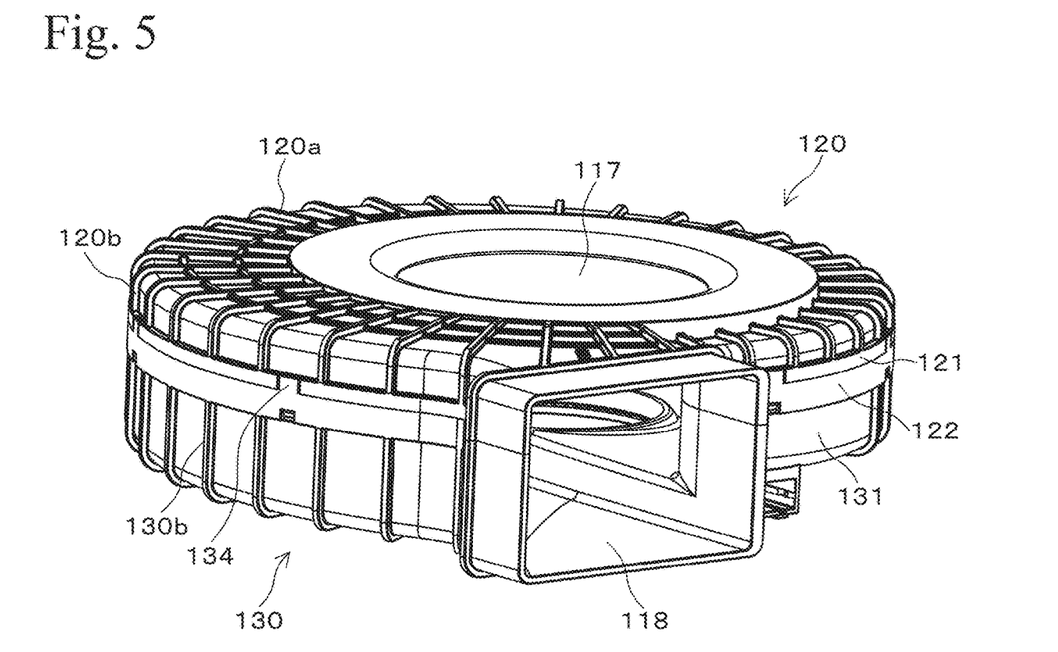
FIG. 5 is a perspective view illustrating a state of assembling the upper casing and the lower casing of the centrifugal fan of the embodiment of the disclosure.
Figure 6:
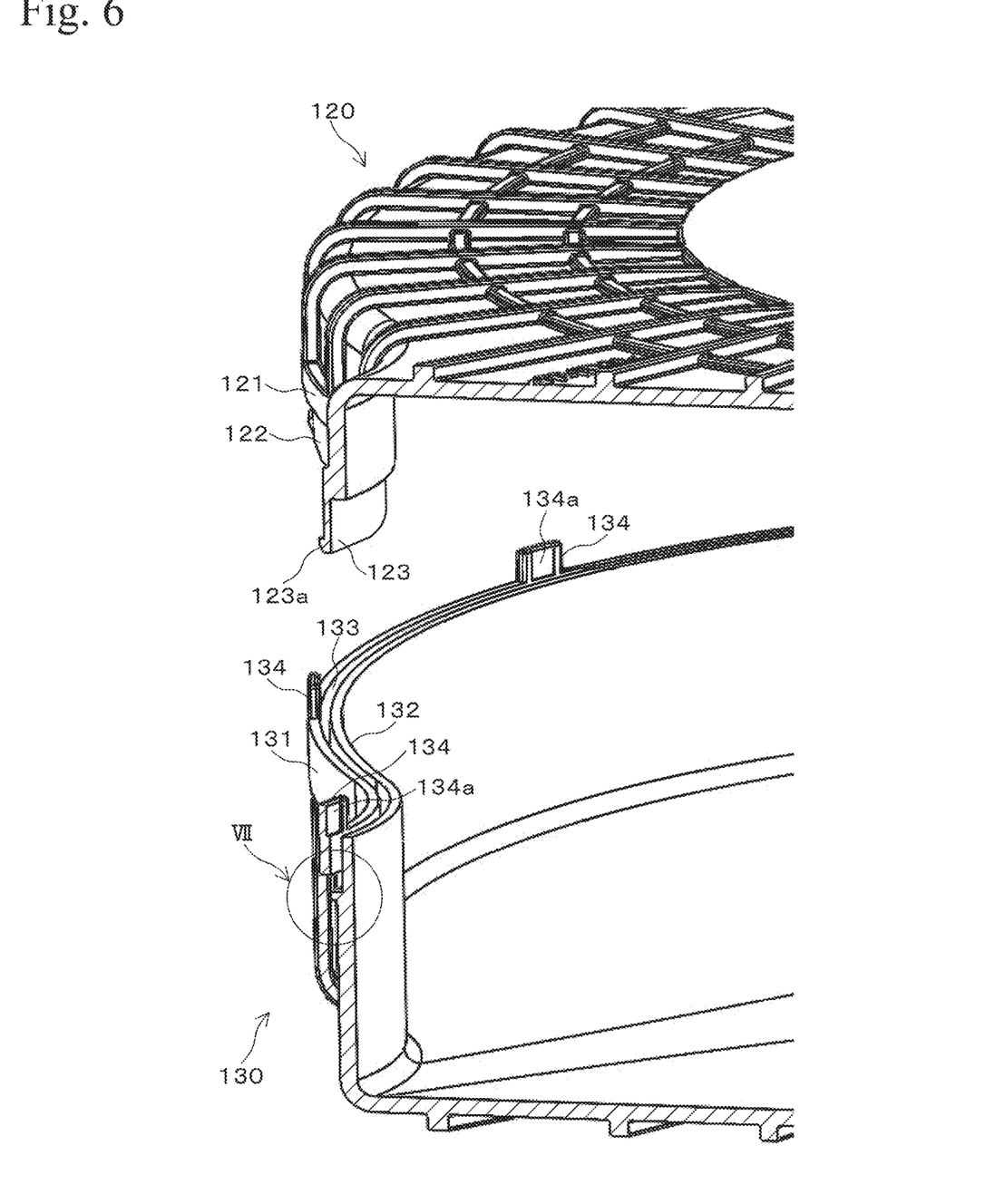
FIG. 6 is a partially broken sectional view illustrating main parts of the upper casing and the lower casing of the centrifugal fan of the embodiment of the disclosure.

The claw part 123 of the upper casing 120 is aligned with the position of the protrusion part 134 of the lower casing 130, and the upper and lower casings 120 and 130 are brought close to each other to fit the claw part 123 into the groove part 134a of the protrusion part 134. At this time, the inclined surface 123a of the claw part 123 comes into sliding contact with an upper end corner part of the groove part 134a, and the claw part 123 is smoothly inserted into the groove part 134a.

When the upper and lower casings 120 and 130 are further brought closer, the claw part 123 enters the pocket part 133. At this time, the inclined surface 123a of the claw part 123 comes into sliding contact with a lower end corner part of the groove part 134a, and smoothly comes out of the groove part 134a to push and expand the lower outer peripheral wall part 131 radially outward. Then, the fitting part 122 is inserted into the pocket part 133 having an increased width.

When the upper and lower casings 120 and 130 are further brought closer, the protrusion part 134 is inserted into the cutout part 124 of the upper outer peripheral wall part 121, subsequently, the cutout part 124 is embedded by the protrusion part 134, and the claw part 123 abuts the flange part 136 to engage with the engagement hole part 135.

Due to this, the lower outer peripheral wall part 131 pushed and expanded radially outward by the claw part 123 elastically returns radially inward, and the radial dimension of the pocket part 133 decreases and is brought into a state of being matching or slightly larger than the radial dimension of the fitting part 122. In this state, the claw part 123 is accommodated in the engagement hole part 135 and does not protrude radially outward. The fitting part 122 is brought into a state of being immovable in the vertical direction and the radial direction.

Thus, the coupling of the upper and lower casings 120 and 130 is completed. In the state where the upper and lower casings 120 and 130 are coupled, the lower end surface of the upper outer peripheral wall part 121 and the upper end surface of the lower outer peripheral wall part 131 are butted against each other, and the outer peripheral surfaces of both become flush with each other.

4. Effects

According to the centrifugal fan 100 having the above configuration, since the claw part 123 is accommodated in the engagement hole part 135, a degree of freedom of arrangement of the centrifugal fan 100 in, for example, the vehicle body is secured, and damage to the claw part 123 can be prevented in advance.

In particular, in the above embodiment, since the lower outer peripheral wall part 131 includes the protrusion part 134 protruding toward the upper casing 120 side, and the upper outer peripheral wall part 121 includes the cutout part 124 fitted with the protrusion part 134, these serve as guides when the upper and lower casings 120 and 130 are coupled, and workability is improved.

Since the outer peripheral surface of the protrusion part 134 has a dimension flush with the outer peripheral surface of the upper outer peripheral wall part 121, a smooth appearance is obtained, the appearance is improved, and the commercial value is increased.

In the above embodiment, since the groove part 134a is formed at the inner peripheral surface of the protrusion part 134 and thus the claw part 123 is fitted into and comes into sliding contact with the groove part 134a, these serve as guided when the upper and lower casings 120 and 130 are coupled, and workability is improved.

In the above embodiment, since the inclined surface 123a having a thickness gradually decreasing downward is formed at the distal end part of the claw part 123, the claw part 123 can be smoothly moved when the claw part 123 is inserted into the groove part 134a and when the claw part 123 is taken out from the groove part 134a.

In the above embodiment, since the inner peripheral wall part 132 is included at an inner side of the lower outer peripheral wall part 131, and the pocket part 133 accommodating the fitting part 122 is provided between the inner peripheral wall part 132 and the lower outer peripheral wall part 131, a labyrinth structure including the lower outer peripheral wall part 131, the fitting part 122, and the inner peripheral wall part 132 is formed, and dust and water hardly enter from the outside. Radial movement of the fitting part 122 is blocked, and the upper and lower casings 120 and 130 can be firmly fixed.

In the above embodiment, since the outer periphery of the inner peripheral wall part 132 is provided with the flange part 136 protruding radially outward and the claw part 123 is configured to abut the flange part 136, downward movement of the fitting part 122 is blocked, and the upper and lower casings 120 and 130 can be firmly fixed.

In the above embodiment, since the radial dimension of the pocket part 133 is set to be smaller than the radial dimension of the claw part 123, radial backlash of the fitting part 122 in the pocket part 133 can be reduced.

5. Modifications

The disclosure is not limited to the above embodiment, and various modifications can be made as follows.

i) The inner peripheral wall part 132 and the protrusion part 134 are not necessarily required to obtain the effect of the disclosure.

ii) In the above embodiment, the flange part 136 is provided at the outer periphery of the inner peripheral wall part 132, but may be provided at the inner periphery of the lower outer peripheral wall part 131.

iii) The fitting part 122 is provided over the entire circumference of the upper outer peripheral wall part 121, but may be provided intermittently in the circumferential direction.

iv) The engagement hole part 135 may be a hole having a closed outer peripheral side without penetrating in the radial direction.

v) The inner peripheral wall part 132 may be configured separately from the lower outer peripheral wall part 131, and may be connected to the lower outer peripheral wall part 131 by means of adhesion or the like.

vi) The lower casing 130 may be provided with the fitting part 122, the upper casing 120 may be provided with the inner peripheral wall part 132, and the upper outer peripheral wall part 121 may be provided with the engagement hole part 135.

INDUSTRIAL APPLICABILITY

The disclosure can be used for a centrifugal fan used for air blowing, ventilation, cooling, and the like in home appliances, office automation equipment, and air conditioners for industrial use and vehicles.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A centrifugal fan accommodating an impeller and a motor for rotating the impeller inside a casing formed by coupling a first casing and a second casing with a first coupling part and a second coupling part, wherein
the first casing includes a first outer peripheral wall part forming an outer peripheral surface,
the second casing includes a second outer peripheral wall part forming an outer peripheral surface,
the first coupling part includes a fitting part positioned radially more inward than an outer peripheral surface of the first outer peripheral wall part, protrudes toward the second casing side, and fits at an inner side of the second outer peripheral wall part,
the fitting part includes a claw part protruding radially outward at an end part at the second casing side, and
the second coupling part includes an engagement recess part provided at the second outer peripheral wall part and engaging with the claw part,
wherein the claw part engages with the engagement recess part in a gap between the second outer peripheral wall part and an inner peripheral wall part formed radially inward of the second outer peripheral wall part, such that the fitting part is fixed in the radial direction.

2. The centrifugal fan according to claim 1, wherein the fitting part is integrally formed of a resin with the first outer peripheral wall part and extends along the first outer peripheral wall part.

3. The centrifugal fan according to claim 1, wherein the engagement recess part penetrates in a radial direction.

4. The centrifugal fan according to claim 1, wherein the claw part is accommodated in the engagement recess part.

5. The centrifugal fan according to claim 1, wherein an inclined surface with a thickness gradually decreasing toward the second outer peripheral wall part side is formed at a distal end part of the claw part.

6. The centrifugal fan according to claim 1, wherein an outer peripheral surface of the first outer peripheral wall part and an outer peripheral surface of the second outer peripheral wall part are flush with each other.

7. A centrifugal fan accommodating an impeller and a motor for rotating the impeller inside a casing formed by coupling a first casing and a second casing with a first coupling part and a second coupling part, wherein the first casing includes a first outer peripheral wall part forming an outer peripheral surface, the second casing includes a second outer peripheral wall part forming an outer peripheral surface, the first coupling part includes a fitting part positioned radially more inward than an outer peripheral surface of the first outer peripheral wall part, protrudes toward the second casing side, and fits at an inner side of the second outer peripheral wall part, the fitting part includes a claw part protruding radially outward at an end part at the second casing side, and the second coupling part includes an engagement recess part provided at the second outer peripheral wall part and engaging with the claw part, wherein the second outer peripheral wall part includes a protrusion part protruding toward the first casing side, and the first outer peripheral wall part includes a cutout part fitted with the protrusion part.

8. The centrifugal fan according to claim 7, wherein an outer peripheral surface of the first outer peripheral wall part and an outer peripheral surface of the protrusion part are flush with each other.

9. The centrifugal fan according to claim 7, wherein an inner peripheral surface of the protrusion part is provided with a groove part fitted and in sliding contact with the claw part.

10. A centrifugal fan accommodating an impeller and a motor for rotating the impeller inside a casing formed by coupling a first casing and a second casing with a first coupling part and a second coupling part, wherein the first casing includes a first outer peripheral wall part forming an outer peripheral surface, the second casing includes a second outer peripheral wall part forming an outer peripheral surface, the first coupling part includes a fitting part positioned radially more inward than an outer peripheral surface of the first outer peripheral wall part, protrudes toward the second casing side, and fits at an inner side of the second outer peripheral wall part, the fitting part includes a claw part protruding radially outward at an end part at the second casing side, and the second coupling part includes an engagement recess part provided at the second outer peripheral wall part and engaging with the claw part, wherein an inner peripheral wall part is provided at an inner side of the second outer peripheral wall part, wherein a pocket part accommodating the fitting part is provided between the inner peripheral wall part and the second outer peripheral wall part, and wherein a radial dimension of the pocket part is smaller than a radial dimension of the claw part.

11. The centrifugal fan according to claim 10, wherein the inner peripheral wall part is integrally formed of resin with the second outer peripheral wall part and extends along the second outer peripheral wall part.

12. The centrifugal fan according to claim 10, wherein an outer periphery of the inner peripheral wall part or an inner periphery of the second outer peripheral wall part is provided with a flange part protruding radially outward or radially inward, and the claw part abuts the flange part.

* * * * *